(No Model.)
E. K. HAYES.
CORN PLANTER FRAME.
No. 592,970. Patented Nov. 2, 1897.
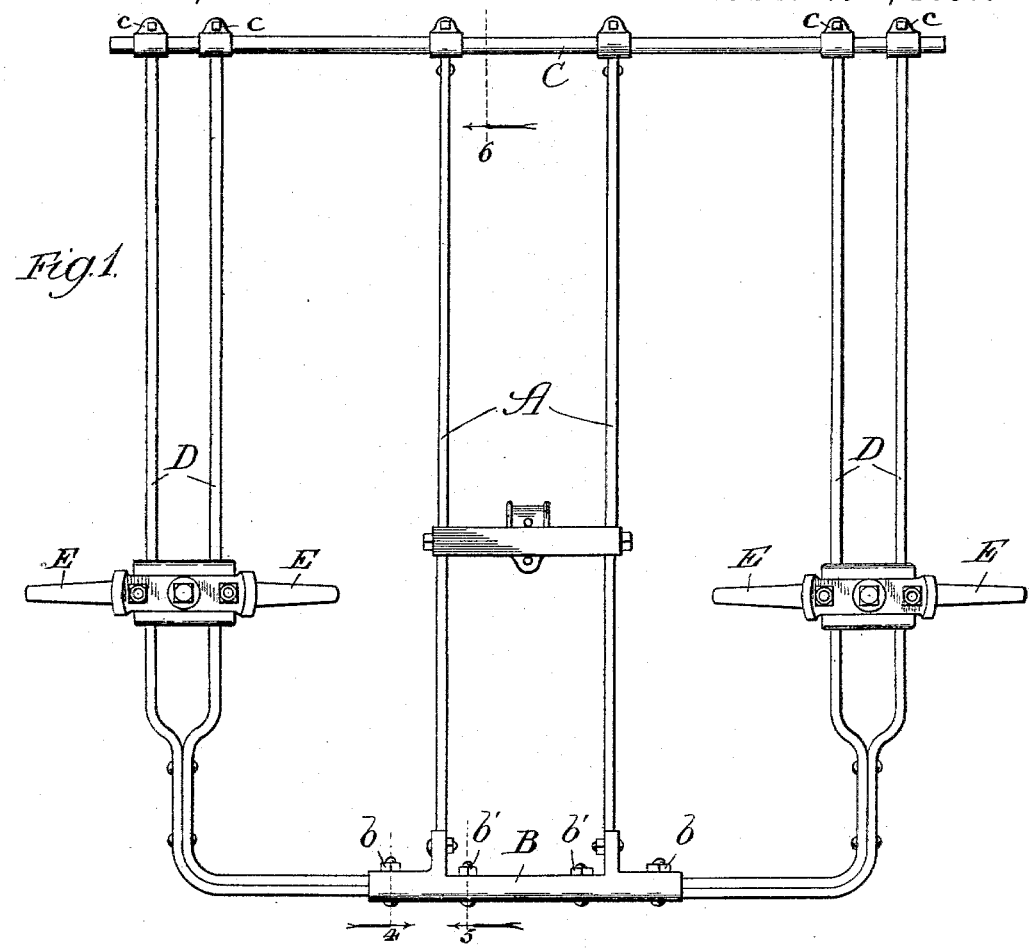
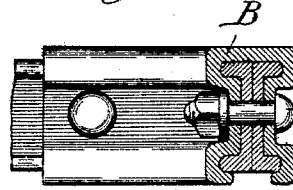
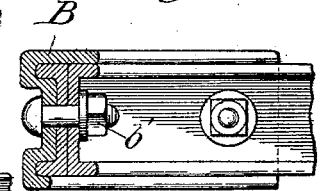
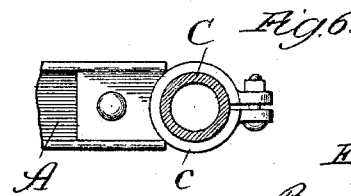
Witnesses:
Inventor:
Eugenio K. Hayes,
By Banning & Banning & Sheridan,
Attys

UNITED STATES PATENT OFFICE.

EUGENIO K. HAYES, OF GALVA, ILLINOIS.

CORN-PLANTER FRAME.

SPECIFICATION forming part of Letters Patent No. 592,970, dated November 2, 1897.

Application filed August 5, 1897. Serial No. 647,144. (No model.)

*To all whom it may concern:*

Be it known that I, EUGENIO K. HAYES, a citizen of the United States, residing at Galva, Illinois, have invented certain new and useful Improvements in Corn-Planters, of which the following is a specification.

My invention has more particular reference to the rear frame of a corn-planter in which diverging wheels are used to cover the grain dropped in the furrow made by the runner; and its particular object is to provide means for the adjustment of the wheels in or out; and my invention consists in the features and details of construction hereinafter described and claimed.

In the drawings, Figure 1 is a plan view of my improved planter-frame; Fig. 2, a plan view of the end of the center frame. Fig. 3 shows a side elevation of the frame-bars; Fig. 4, a section taken in the line 4 of Fig. 1; Fig. 5, a section taken in the line 5 of Fig. 1, and Fig. 6 a section taken in the line 6 of Fig. 1.

In making my improved planter-frame I make a center frame A, preferably of channel-iron and U-shaped, as shown in the drawings. I arrange on the rear or closed end of the center frame a sleeve B, adapted to partially embrace the frame A and to be bolted to its ends and sides. Through the front or open ends of the center frame I arrange a transverse tube or bar C, which is embraced and held by the front ends of the center frame, as shown in Fig. 6. The outer or wheel frames D are preferably made bifurcated, as shown in Fig. 1, and attached to the tube or rod C at their front ends in the same manner that the ends of the center frame are attached, so as to be clamped upon or loosened from the tube or bar. By loosening the bolts $c$ in them the front ends of the wheel-frame may be moved in or out along the bar, as may be necessary in the adjustment of the parts. The rear ends of the wheel or outer frames are riveted or fastened together, as shown in Fig. 1, and enter the ends of the sleeve B. They are provided with a series of holes $d$ and $d'$, adapted to register with holes arranged in the sleeve B. The outer bolts $b$ pass through a hole in the outer ends of the sleeve and through the hole $d$ in the ends of the outer frame, while the inner bolts $b'$ pass through the sleeve, the hole $d'$ in the end of the wheel-frame, and through the center frame A.

The wheels are mounted on spindles E, supported in the bifurcated portion of the wheel-frame D. In order to adjust the wheels in or out to enable them to properly follow the runners when adjusted in or out, the bolts $b$ and $b'$ are removed and the bolts $c$ loosened, when the wheel-frames are moved in or out the desired distance, the bolts $c$ tightened, and the bolts $b$ $b'$ again inserted through the holes proper to hold the parts in their new position of adjustment.

What I regard as new, and desire to secure by Letters Patent, is—

1. The combination of a center frame, wheel-frames separate from each other, and means for holding the wheel-frames in desired positions of adjustment toward or from each other.

2. The combination of a center frame, a sleeve arranged at its rear end transversely thereon, a bar arranged transversely in its front end, wheel-frames embracing the bar at their front ends and entering the sleeve at their rear ends, and means for holding the wheel-frames in desired positions of adjustment.

3. The combination of a center frame, two supporting wheel-frames bifurcated to form a support for the wheel-axles and bent inwardly toward each other in rear of the wheel-axles.

4. The combination of a center frame, two supporting wheel-frames bifurcated to form a support for the wheel-axles and to permit the runner-standards to work between the bifurcations, and bent inwardly toward each other in rear of the wheel-axles.

EUGENIO K. HAYES.

Witnesses:
 A. L. PETERSON,
 W. H. MCELROY.